United States Patent
Tang

(10) Patent No.: US 6,604,428 B1
(45) Date of Patent: Aug. 12, 2003

(54) BOURDON-TUBE PRESSURE GAUGE

(76) Inventor: Ming-Tsung Tang, No. 9, S-Wei St., Da-Li City, Taichung Hsien (TW)

( * ) Notice: Subject to any disclaimer, the term of this patent is extended or adjusted under 35 U.S.C. 154(b) by 0 days.

(21) Appl. No.: 10/210,289

(22) Filed: Aug. 2, 2002

(51) Int. Cl.[7] .................................................. G01L 7/04
(52) U.S. Cl. ....................................................... 73/743
(58) Field of Search ........................... 73/732, 741, 742, 73/743, 756, 733–740

(56) References Cited

U.S. PATENT DOCUMENTS 3,641,966 A * 2/1972 Auerdahl ..................... 116/271
4,023,416 A * 5/1977 Ormsby ......................... 73/744
4,100,812 A * 7/1978 Gray et al. ..................... 73/732
4,173,150 A * 11/1979 Gray ............................. 73/714

* cited by examiner

*Primary Examiner*—William Oen
(74) *Attorney, Agent, or Firm*—Charles E. Baxley

(57) ABSTRACT

A structure for Bourdon-tube pressure gauge includes a frame on which a needle gear and a limit bar are respectively connected. A Bourdon tube is connected between a test tip and an indicator which is pivotally connected to the frame. A rack portion is connected to the indicator and is engaged with the needle gear no matter how much the indicator swings. A concave portion is defined in a side of the indicator and a protrusion portion extends from the side of the indicator. The indicator is stopped by the limit bar when either the concave portion or the protrusion portion engages with the limit bar.

1 Claim, 2 Drawing Sheets

BOURDON-TUBE PRESSURE GAUGE

FIELD OF THE INVENTION

The present invention relates to a Bourdon-tube pressure gauge wherein the indicator has a rack portion which is swung within a range such that the rack portion is always engaged with a needle gear.

BACKGROUND OF THE INVENTION

A conventional Bourdon-tube gauge is disclosed in U.S. Pat. Nos. 6,314,816 and 5,567,883 respectively and includes an indicator which is pivotally connected to a frame and a needle gear is connected. The indicator includes a rack portion which is expected to be engaged with the needle gear when the Bourdon tube is deformed to rotate the indicator. However, it is noted that the rack portion is not engaged with the needle gear when the indicator is positioned at least one of the two extreme positions. In other words, when an extraordinary high or low pressure is tested and the Bourdon tube is deformed dramatically, the two extreme positions of the indicator will let the rack portion disengage from the needle gear. These two extreme positions imply that the pressure tested is beyond the desired precision of the Bourdon-tube gauge.

The present invention intends to provide a Bourdon-tube pressure gauge wherein the range of the swing of the indicator is limited to ensure the rack portion of the indicator is always engaged with the needle gear whenever the pressure tested is high or low.

SUMMARY OF THE INVENTION

In accordance with one aspect of the present invention, there is provided a structure for Bourdon-tube pressure gauge which comprises a casing with a test tip extending from the casing and a frame is fixedly positioned in the casing. A needle gear and a limit bar are respectively connected to the frame. A Bourdon tube has one end thereof connected to the test tip and the other end of the Bourdon tube is connected to a link. An indicator is pivotally connected to the frame and a first end of the indicator is pivotally connected to the link and a second end of the indicator has a rack portion which is engaged with the needle gear. A concave portion is defined in a side of the indicator and a protrusion portion extends from the side of the indicator. The rack portion is engaged with the needle gear when the concave portion is engaged with the limit bar.

The primary object of the present invention is to provide a Bourdon-tube pressure gauge wherein the rack portion of the indicator is engaged with the needle gear all the time no matter how high or low of the pressure is tested.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
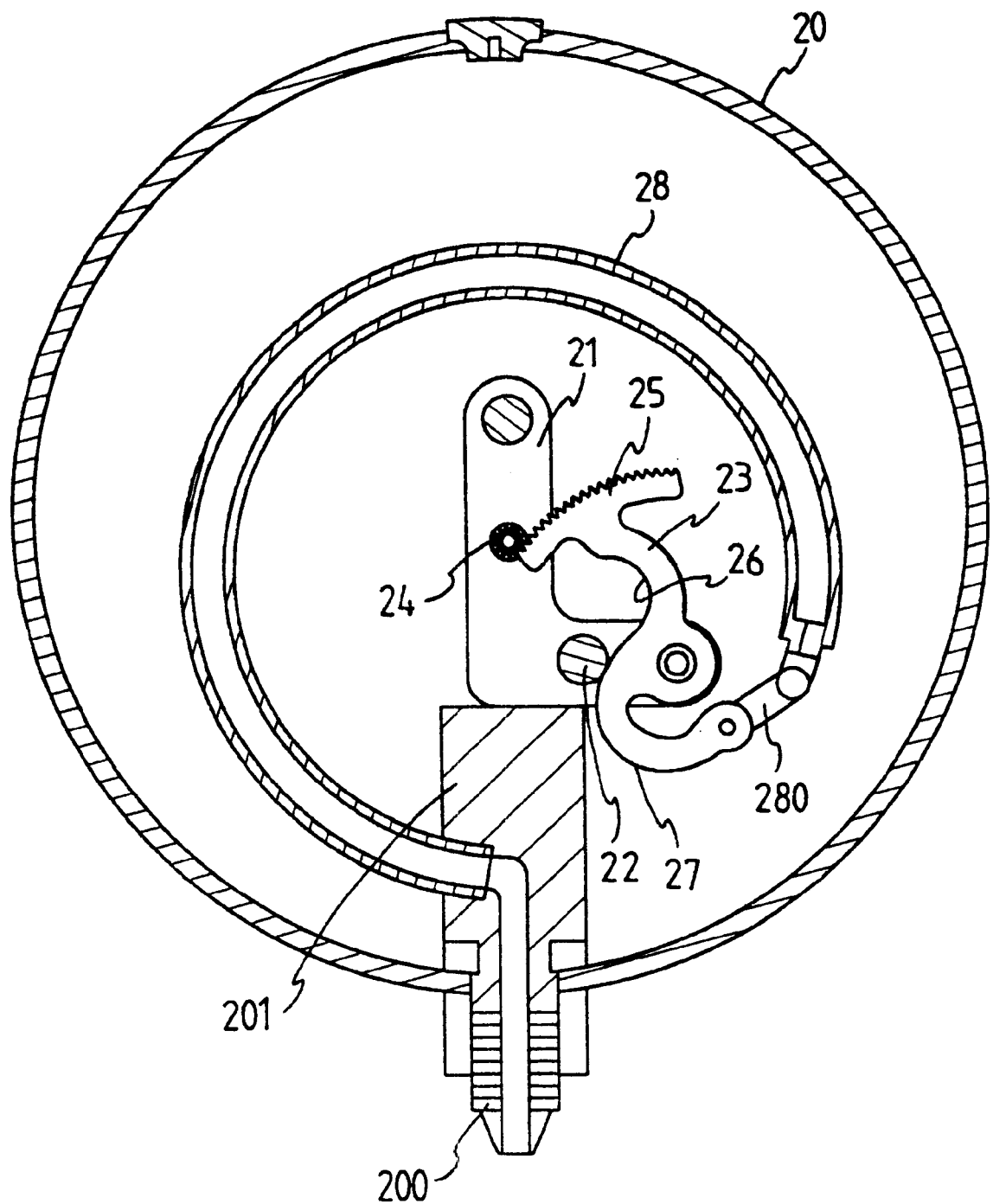
FIG. 1 is a cross sectional view to show a Bourdon-tube pressure gauge of the present invention, wherein the protrusion portion of the indicator is stopped by the limit bar and the rack portion of the indicator is engaged with the needle gear.
Figure 2:
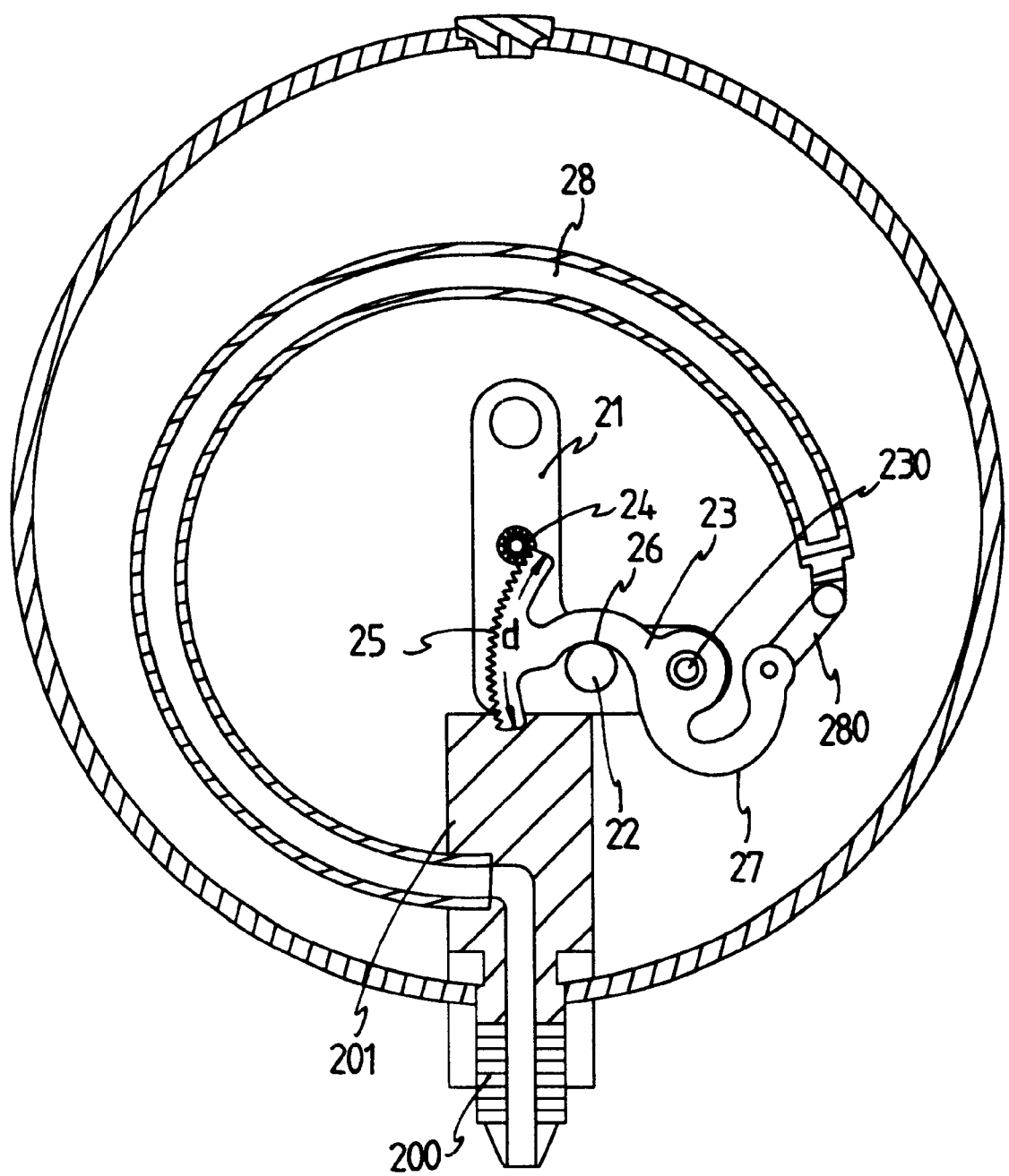
FIG. 2 is a cross sectional view to show the Bourdon-tube gauge of the present invention, wherein the protrusion portion of the indicator is engaged with the limit bar and the rack portion of the indicator is engaged with the needle gear.

Referring to FIGS. 1 and 2, the Bourdon-tube pressure gauge of the present invention comprises a casing 20 with a test tip 200 extending from the casing 20 and a support base 201 is connected to the test tip 200. An L-shaped frame 21 is fixedly positioned on the support base 201, and a needle gear 24 and a limit bar 22 are respectively connected to the frame 21.

A Bourdon tube 28 is located in the casing 20 and one end of the Bourdon tube 28 is connected to the test tip 200 and the other end of the Bourdon tube 28 is connected to a link 280. An indicator 23 is pivotally connected to the frame 21 at the pivot point 230. A first end of the indicator 12 is pivotally connected to the link 280 and a second end of the indicator 23 has a rack portion 25 which is engaged with the needle gear 24. A concave portion 26 is defined in a side of the indicator 23 and a protrusion portion 27 extends from the side of the indicator 23. The needle gear 24 is located at the circle that the rack portion 25 moves.

It is to be noted that the rack portion 25 of the indicator 23 is maintained to be engaged with the needle gear 24 all the time. That is to say, when the indicator 23 swings to one of two extreme positions as shown in FIG. 2 because of the deformation of the Bourdon tube 28, and the concave portion 26 is engaged with the limit bar 22, the rack portion 25 of the indicator 23 is engaged with the needle gear 24. Similarly, as shown in FIG. 1, the rack portion 25 is still engaged with the needle gear 24 when the protrusion portion 27 is engaged with the limit bar 22 at the other extreme position. The range of the swing of the indicator 23 is set such that the rack portion 25 is engaged with the needle gear 24 whenever the gauge is in operation status or not. The length of the arc "d" that the rack portion 25 of the indicator 23 swings between the two extreme positions is the same or smaller than the length of the rack portion 25 so as to ensure that the rack portion 25 is engaged with the needle gear 24 all the time.

Accordingly, when assembling the Bourdon-tube pressure gauge, because the rack portion 25 is engaged with the needle gear 24 so that the assemblers can easily check whether the assembly is correct or not. When the gauge is doubt to be out of service, the user may check the engagement of the rack portion 25 and the needle gear 24 to determine whether the parts of the gauge have problems or because of an extraordinary pressure applied to the gauge to cause damage to the gauge.

While we have shown and described various embodiments in accordance with the present invention, it should be clear to those skilled in the art that further embodiments may be made without departing from the scope and spirit of the present invention.

What is claimed is:

1. A structure for Bourdon-tube gauge comprising:

a casing with a test tip extending from the casing, a frame fixedly positioned in said casing and a needle gear and a limit bar respectively connected to said frame;

a Bourdon tube is located in the casing and one end of said Bourdon tube connected to said test tip and the other end of said Bourdon tube connected to a link, and an indicator pivotally connected to said frame, a first end of said indicator pivotally connected to said link and a second end of said indicator having a rack portion which is engaged with said needle gear, the needle gear located at a circular track that the rack portion moves, and a concave portion defined in a side of said indicator and a protrusion portion extending from said side of said indicator, a first extreme position being defined when said concave portion is engaged with said limit bar, a second extreme position being defined when said protrusion portion is engaged with said limit bar, and a length of an arc that the rack portion of the indicator swings between the first and second extreme positions of the indicator is smaller than a length of the rack portion so as to ensure that the rack portion is engaged with the needle gear all the time.

* * * * *